United States Patent
Kopka et al.

(10) Patent No.: US 12,426,141 B2
(45) Date of Patent: Sep. 23, 2025

(54) ARRANGEMENT FOR PROVIDING AT LEAST TWO DIFFERENT LIGHT FUNCTIONS FOR A VEHICLE

(71) Applicant: HELLA GmbH & Co. KGaA, Lippstadt (DE)

(72) Inventors: Fabian Kopka, Wadersloh (DE); Alexander Knies, Schloss Holte-Stukenbrock (DE); Manuel Winkler, Ruethen (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 109 days.

(21) Appl. No.: 18/220,915

(22) Filed: Jul. 12, 2023

(65) Prior Publication Data
US 2023/0354493 A1 Nov. 2, 2023

Related U.S. Application Data

(63) Continuation of application No. PCT/EP2022/050189, filed on Jan. 6, 2022.

(30) Foreign Application Priority Data

Jan. 13, 2021 (DE) .................. 10 2021 100 543.4

(51) Int. Cl.
H05B 45/50 (2022.01)
B60Q 1/00 (2006.01)
(Continued)

(52) U.S. Cl.
CPC ........... H05B 45/50 (2020.01); B60Q 1/0023 (2013.01); B60Q 1/0076 (2013.01); H05B 47/17 (2020.01)

(58) Field of Classification Search
None
See application file for complete search history.

(56) References Cited

U.S. PATENT DOCUMENTS 7,301,447 B2    11/2007  Patel
7,329,994 B2    2/2008   Toda et al.
(Continued)

FOREIGN PATENT DOCUMENTS

DE    102006006778 A1    8/2006
DE    102006015053 B4    1/2008
(Continued)

OTHER PUBLICATIONS

KR20210133646A—translation.*
International Search Report dated Apr. 22, 2022 in corresponding application PCT/EP2022/050189.

*Primary Examiner* — Anh Q Tran
(74) *Attorney, Agent, or Firm* — Muncy, Geissler, Olds & Lowe, P.C.

(57) ABSTRACT

An arrangement for providing at least one or multiple different light functions for a vehicle having: a first lamp segment for providing a first light function in a first normal operation mode, a second lamp segment for providing the first or a second light function in a second normal operation mode, wherein the second lamp segment is connected in parallel to the first lamp segment, at least one switch for switchover between the first and second normal operation modes, and a monitoring device that is electrically connected to the lamp segments in order to sense an electrical voltage across the lamp segments for distinguishing the normal operation modes from faulty operation of the lamp segments.

11 Claims, 6 Drawing Sheets

(51) Int. Cl.
*H05B 45/46* (2020.01)
*H05B 47/17* (2020.01)

(56) References Cited

U.S. PATENT DOCUMENTS

| | | | |
|---|---|---|---|
| 9,295,118 B2 | 3/2016 | Nietfeld | |
| 9,977,095 B2 | 5/2018 | Kovatchev et al. | |
| 9,986,616 B2 * | 5/2018 | Hong | B60Q 1/46 |
| 10,440,786 B1 * | 10/2019 | Stoegner | H05B 45/52 |
| 10,889,244 B2 | 1/2021 | Ueno et al. | |
| 2012/0200296 A1 | 8/2012 | Avenel | |
| 2018/0339641 A1 * | 11/2018 | Matsui | H05B 45/375 |
| 2020/0253010 A1 * | 8/2020 | Pampattiwar | H05B 45/44 |

FOREIGN PATENT DOCUMENTS

| | | | |
|---|---|---|---|
| DE | 102011079473 B4 | 4/2013 | |
| DE | 102012101363 A1 | 8/2013 | |
| DE | 102012218772 B3 | 10/2014 | |
| DE | 102016116219 A1 | 3/2017 | |
| DE | 102008047731 B4 | 6/2020 | |
| EP | 2487999 A1 | 8/2012 | |
| EP | 2783915 A1 | 10/2014 | |
| JP | 200816302 A | 1/2008 | |
| KR | 20210133646 A * | 11/2021 | B60Q 1/1423 |

* cited by examiner

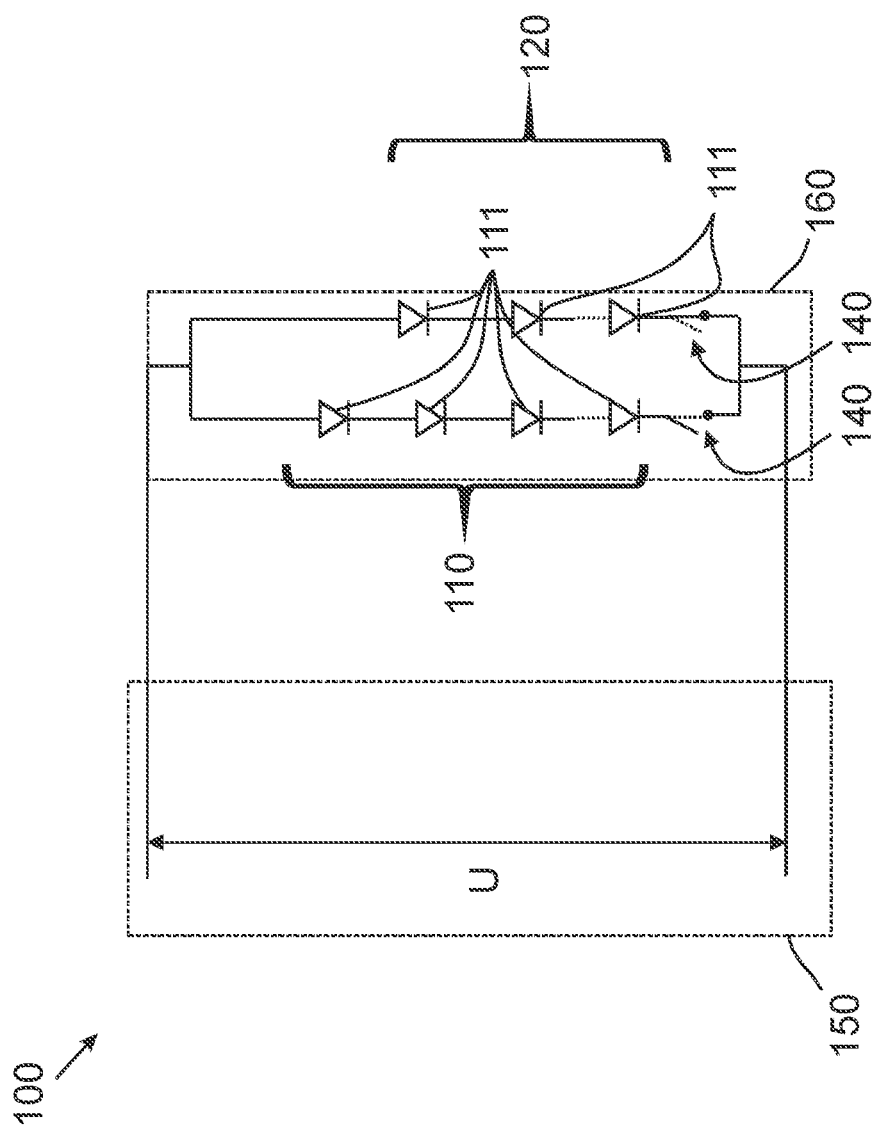

ARRANGEMENT FOR PROVIDING AT LEAST TWO DIFFERENT LIGHT FUNCTIONS FOR A VEHICLE

This nonprovisional application is a continuation of International Application No. PCT/EP2022/050189, which was filed on Jan. 6, 2022, and which claims priority to German Patent Application No. 10 2021 100 543.4, which was filed in Germany on Jan. 13, 2021, and which are both herein incorporated by reference.

BACKGROUND OF THE INVENTION

Field of the Invention

The present invention relates to an arrangement for providing at least one or multiple light functions for a vehicle and relates to a method for diagnosis of faulty operation in at least one light function for a vehicle.

Description of the Background Art

It is known from the prior art that different light functions of a vehicle, such as daytime running light and directional indicator, are provided by light-emitting diodes, also referred to as LEDs for short. A control unit of the vehicle, also referred to as ECU (electronic control unit), can have multiple channels in order to drive one or more LED segments in alternation. Each LED segment can have multiple LEDs in this case.

Conventional arrangements are disclosed in the documents DE 10 2008 047 731 B4, DE 10 2011 079 473 B4, DE 10 2006 015 053 B4 (which corresponds to US 2006/0232394), and DE 10 2016 116 219 A1 (which corresponds to US 2017/0072837).

A disadvantage of the known solutions is that diagnosis of a fault in the driving of the LED segments is technically complex.

SUMMARY OF THE INVENTION

It is therefore an object of the present invention to at least partially overcome the above-described disadvantages. In particular, it is an object of the present invention to provide more reliable and/or technically simpler diagnosis.

The object is attained, in particular, by an arrangement, in particular an electronic circuit arrangement, for providing at least one light function or multiple different light functions for a vehicle. The vehicle can be, for example, an automobile and/or a truck. The light functions are, for example, functions of the vehicle lighting of the vehicle.

The arrangement according to the invention can have the following components: a first lamp segment for providing a first light function in a first normal operation mode; a second lamp segment for providing the first or a second light function in a second normal operation mode, wherein preferably the second light function differs from the first light function, wherein preferably the second lamp segment is connected in parallel to the first lamp segment, wherein especially preferably each lamp segment has a separate current path in which lamps are arranged; at least one switch for switchover between the first and second normal operation modes, in particular through an alternating opening and closing of the current paths of the lamp segments, preferably in such a manner that a first current path of the first lamp segment is never closed simultaneously with a second current path of the second lamp segment so that an electric current is especially preferably routed through the first and second current paths in alternation by means of the switchover; and a monitoring device, such as a microcontroller and/or an ECU, that is electrically connected to the lamp segments in order to sense, and in particular to measure the value of, an electrical voltage across the lamp segments for distinguishing the normal operation modes from faulty operation of the lamp segments.

The lamp segments can be designed to be different in such a manner that the electrical voltages sensed in the first and second normal operation modes by the monitoring device differ from one another. The monitoring device is preferably a control unit with the function of voltage measurement. The LEDs preferably are arranged asymmetrically.

Faulty operation is present when, for example, the switchover by the switch is faulty, which is to say, for example, an unwanted flow of electric current through the second lamp segment occurs in the first normal operation mode or conversely an unwanted flow of electric current through the first lamp segment occurs in the second normal operation mode. This faulty operation can be caused, for example, by a failure of the switch or of an electrical supply line from the monitoring device to the switch.

The different design of the lamp segments has the advantage that a level of the sensed voltage in normal operation can unambiguously indicate which of the lamp segments an electric current is flowing through, in particular at the time of the sensing. Since the electrical voltages are different in the first and second normal operation modes, it is possible to determine, on the basis of the voltage level, which normal operation mode is present (in the sense of an actual value). This determination can then be compared to the switch position (in the sense of a desired value) of the switch. A first switch position of the switch should result in, e.g., current flow through the first lamp segment, which is to say the first normal operation mode, and a second switch position of the switch should result in, e.g., current flow through the second lamp segment, which is to say the second normal operation mode. This desired value can then be compared with the actual value in order to determine faulty operation in the event of a deviation.

The components of the arrangement according to the invention can be arranged, at least in part, on at least one printed circuit board. Furthermore, the components can be implemented as electronic components.

By sensing the voltage, the arrangement according to the invention can provide a diagnostic function for determining the correct current path of the lamp segments. The lamp segments can also be understood as parallel LED strings that can be selected by the switch, also referred to as a selector switch. Provision can be made according to the invention that the lamp segments are designed to be different in that an asymmetrical distribution of the lamps of the lamp segments, which is to say in particular of the LEDs, is provided, in particular with regard to the number and/or the respective voltage drops and/or forward voltages. As a result, a differentiation, and in a simple manner a diagnosis, can take place through the sensing of the voltages when there is a fault in the switchover by the switch.

The lamp segments can be parts of an LED assembly that serves to implement the at least one light function, in particular the functions of daytime running light and directional indicator, preferably all light functions. The LED assembly can have, e.g., at least four lamp segments, for example two apiece for a daytime running light, also referred to as DRL for short, and two for a directional indicator, also referred to as DI for short. It is possible to always ensure that only one of the normal operation modes and/or only one light function is active at any one time. Regardless of the light function, the operation of the lamp segments can take place via multiplexing in this case. This means that the lamp segments are never switched on simultaneously. Advantageously, the lamp segments can be operated in alternation through the multiplexing at 200 Hz with a duty cycle of essentially 50%. This makes sense when, for example, the ECU cannot provide a sufficiently high electrical voltage for all lamps of the lamp segments at the same time.

Another advantage can be achieved within the scope of the invention when the lamp segments are designed to be different in that the lamp segments each have multiple lamps, in particular light-emitting diodes, or LEDs for short, in different numbers so that the lamps are asymmetrically distributed, in particular. The different numbers in this case can bring about a different size voltage drop across the first and second lamp segments depending on which normal operation mode is present and/or whether the at least one switch closes an electric circuit through the first or through the second lamp segment.

Provision can optionally be made that the lamp segments are designed to be different in that the lamp segments provide a different voltage drop for the sensing by the monitoring device. This can be implemented, for example, through the number and/or the choice of type and/or the dimensioning of the lamps. In this way, the difference in the voltage drop can be chosen such that a reliable distinction between the first and second normal operation modes is possible on the basis of the sensed voltage, which is to say on the basis of the voltage drop.

Furthermore, it is possible that the lamp segments are designed such that a voltage drop of the first lamp segment additionally differs from a voltage drop of the second lamp segment by a tolerance window. In other words, the voltage drop across the first lamp segment can be chosen to be greater by a tolerance window than the voltage drop across the second lamp segment. The tolerance window is thus implemented as a separation of the voltage drops in terms of value. The tolerance window is, for example, 8.5 V or can be in a range from 6 V to 10 V or can correspond to at least the maximum intended tolerance of the lamps.

In addition, it is possible within the scope of the invention that the lamp segments each have multiple lamps in the form of light-emitting diodes. The lamp segments can therefore be operated by a channel of the ECU, wherein the channel is designed as, e.g., an LED driver. An assembly can be provided, which the first and second and a third and fourth light segments and, if applicable, still further light segments, have. Each assembly can be operated by a channel of the ECU. Moreover, still further channels of the ECU can be provided for additional assemblies.

It is furthermore possible that the first and/or second light functions are each designed as a light function or as different light functions from among the following light functions of vehicle lighting of the vehicle: a directional indicator, also referred to as turn signal light or blinker, a daytime running light, a high beam, a low beam, a fog light, a parking light, a position light, a brake light, a license plate lighting, a radiator grille lighting, an emblem lighting, and/or lighting to display animations, for example for a coming home function or a leaving home function.

By sensing the voltage, the reliable functioning of the vehicle lighting can therefore be ensured.

Provision can optionally be made that the second lamp segment can be connected in parallel to the first lamp segment by the means that lamps of the first lamp segment are arranged in a parallel current path to lamps of the second lamp segment, wherein preferably a first and a second switch for alternately closing and/or opening the current paths are provided as the at least one switch for the purpose of switchover between the first and second normal operation modes in alternation. The switch thus makes it possible to close, in alternation, the two parallel branches of the parallel circuit consisting of the lamps of the first lamp segment and the lamps of the second lamp segment. It is consequently ensured that either only the first lamp segment, and not the second lamp segment, is operated in the first normal operation mode, or the reverse, that only the second lamp segment, and not the first lamp segment, is operated in the second normal operation mode. Simultaneous operation, and therefore a simultaneous emission of light, by the first and second lamp segments is thus prevented by the switch as long as faulty operation is not present.

Furthermore, provision is optionally made that the parallel circuit of the first and second lamp segments can be connected in series with at least a third lamp segment and a fourth lamp segment, wherein preferably the parallel circuit of the first and second lamp segments and at least the third lamp segment and the fourth lamp segment are driven in alternation by the monitoring device via at least one switching unit in order to provide a respective light function in a respective normal operation mode. Multiple switching units can be provided as the at least one switching unit, wherein the number of switching units can be less than the number of lamp segments of the arrangement according to the invention or of the assembly. In particular, it can be the case that the number of switching units is one less than the number of lamp segments. For example, three switching units can be provided for driving four lamp segments. The at least one switch can also be used in addition for switchover for the first and second lamp segments. Consequently, an alternating operation of the lamp segments, in particular a multiplexing, is possible through a mutually coordinated switching of the switching units and switch.

The switching units can be integrated in the ECU and/or designed as short-circuit switches. Alternatively, or in addition, the switch can be integrated in the ECU or provided separately therefrom on a printed circuit board.

The subject of the invention is likewise a method for diagnosis of faulty operation in at least one or at least two different light functions for a vehicle, wherein the following steps are performed, in particular sequentially in the specified order or in any order, wherein the steps can also be performed repeatedly: providing a first lamp segment of a first light function in a first normal operation mode; providing a second lamp segment of the first or a second light function in a second normal operation mode, wherein preferably the second light function differs from the first light function, wherein preferably the second lamp segment is connected in parallel to the first lamp segment, switchover between the first and second normal operation modes by at least one switch, and sensing by a monitoring device of an electrical voltage across the lamp segments to distinguish the normal operation modes from faulty operation, wherein the monitoring device can be electrically connected to the lamp segments for this purpose.

Provision is made here, in particular, that the normal operation modes are then diagnosed, which is to say identified, by the monitoring device when the electrical voltages sensed in the first and second normal operation modes differ from one another. Otherwise, faulty operation can be diagnosed. As a result, the method according to the invention provides the same advantages as have been described in detail with respect to an arrangement according to the invention. Moreover, the method can be suitable for operating an arrangement according to the invention.

Additional advantages, features, and details of the invention are evident from the description below, in which exemplary embodiments of the invention are described in detail with reference to the drawings. The features mentioned in the claims and in the description can each be essential to the invention individually in themselves, or in any desired combination.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 shows an arrangement according to the invention.

DETAILED DESCRIPTION

Figure 1:
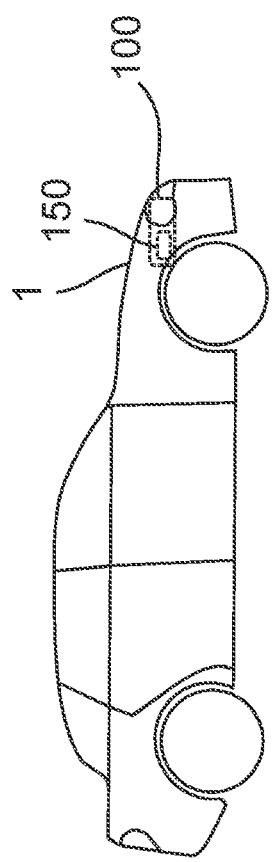
FIG. 1 shows a vehicle with an arrangement according to the invention in a side view.
Figure 2:
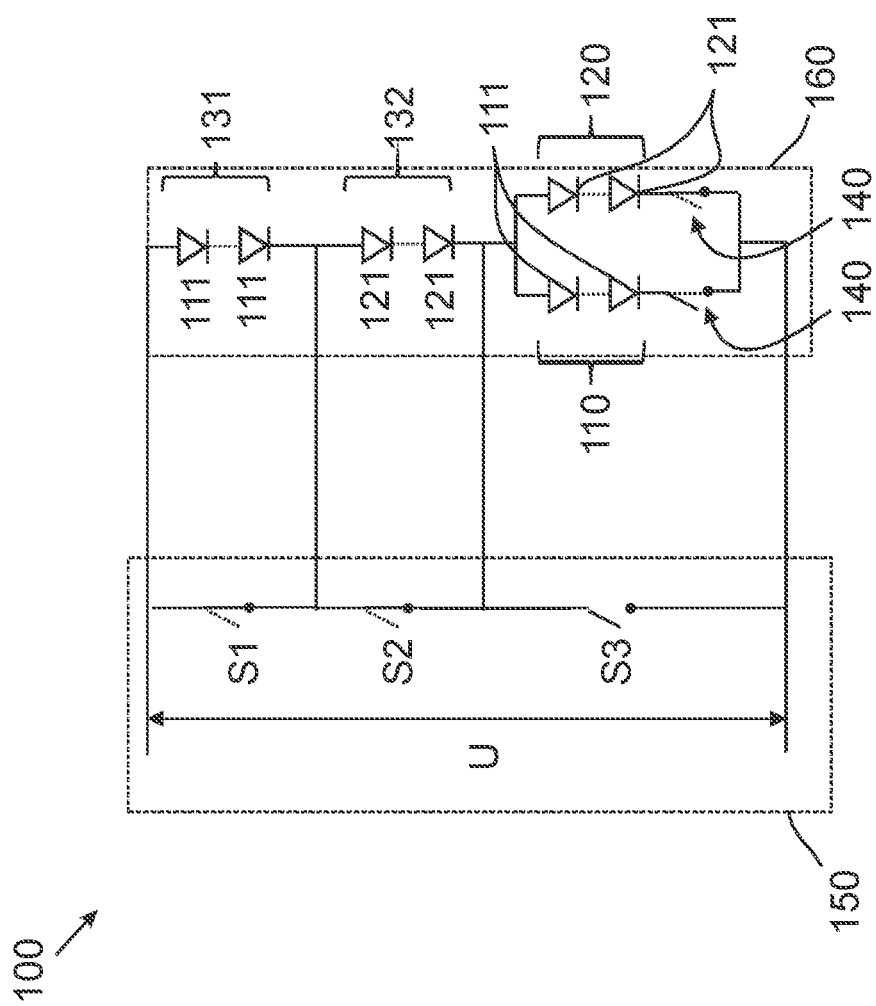
FIG. 2 shows an arrangement according to the invention.
Figure 3:
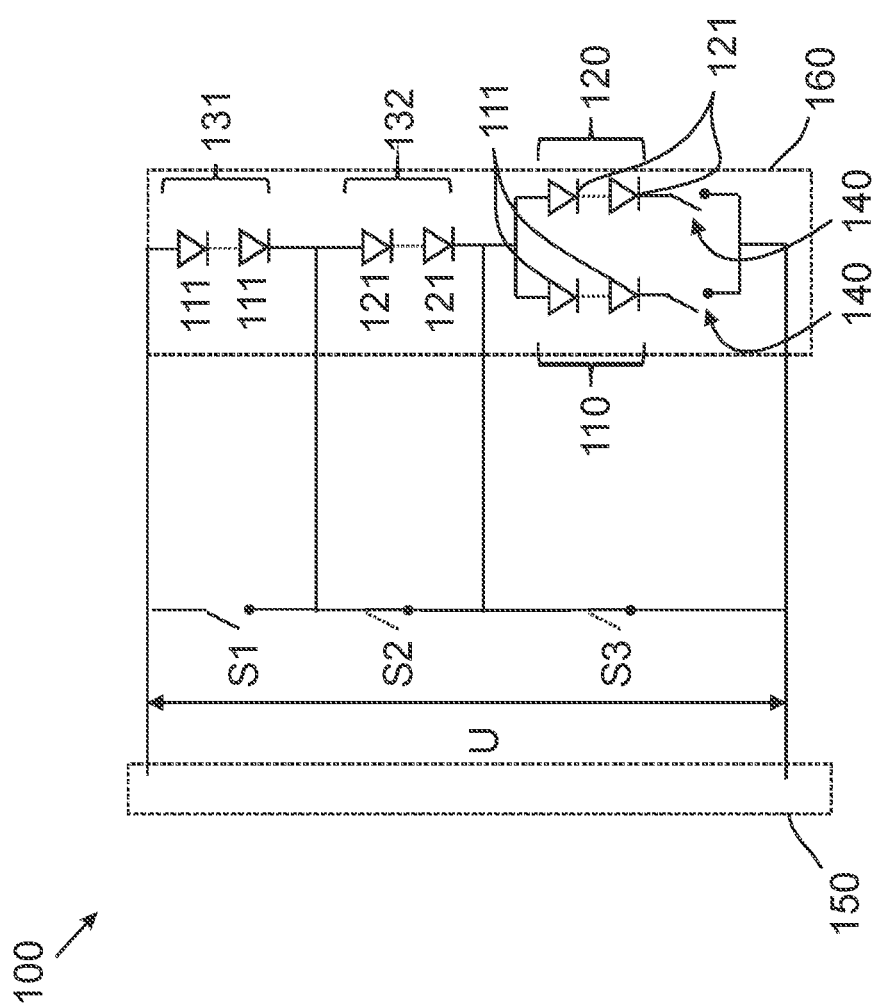
FIG. 3 shows an arrangement according to the invention.

Shown in FIG. 1 is that an arrangement 100 according to the invention can be used in a vehicle 1, for example to provide functions of vehicle lighting, such as operation of a headlight or the like. In FIGS. 2 and 3, the arrangement 100 according to the invention is shown by way of example with further details. Accordingly, a first lamp segment 110 for providing a first light function in a first normal operation mode 210 and a second lamp segment 120 for providing the first or a second light function in a second normal operation mode 220 can be provided. As is shown with further details in FIGS. 2, 3, and 6, the second lamp segment 120 can be connected in parallel to the first lamp segment 110, wherein the parallel current paths can be switched by at least one switch 140. Specifically, two switch 140 are provided that serve the purpose of switchover between the first and second normal operation modes 210,220. The lamp segments 110, 120, and any additional lamp segments 131,132, can each have multiple lamps 111,121 in the form of light-emitting diodes. It is illustrated by means of a dashed line that more lamps may be provided than the number of lamps 111,121 shown in the figures. The aforementioned components of the arrangement 100 according to the invention can be arranged, at least in part, on at least one printed circuit board 160.

In addition, a monitoring device 150, such as a microcontroller, is provided that is electrically connected to the lamp segments 110,120, in particular connected to the anodes and cathodes of the LEDs, in order to sense an electrical voltage U across the lamp segments 110,120 to distinguish the normal operation modes 210,220 from faulty operation of the lamp segments 110,120. The lamp segments 110,120 in this case can be designed to be different in such a manner that the electrical voltages U sensed in the first and second normal operation modes 210,220 differ from one another. In the example shown, the lamp segments 110,120 can be designed to be different such that the lamp segments 110,120 each have the multiple lamps 111,121 in different numbers so that the lamps are asymmetrically distributed.

A variant for only one first light function is shown in FIG. 6, so that the lamps 111 in both lamp segments 110,120 are used for the first light function. Accordingly, the concept of the invention can be used for just one or for at least two light functions, wherein the latter is illustrated in FIGS. 2 and 3. In the example shown in FIG. 6, preferably twelve lamps 111 can be provided in the first lamp segment 110, and six in the second lamp segment 120. The total of eighteen lamps 111 can be operated via only one channel of the monitoring device 150. However, the restriction can be present here that not all eighteen lamps 111 can be operated simultaneously, for example because only a maximum of 50 V are provided on the channel. A series circuit of the eighteen lamps 111 would thus require 63 V by way of example, and would exceed this limit. Through the use of two lamp segments 110,120 as parallel branches and the switchover between the lamp segments 110,120 by the switch 140, the parallel lamp branches can nevertheless be switched alternately.

In order to diagnose which of the lamp segments 110,120 is connected, customarily an additional diagnostic line would be used. Owing to the asymmetrical arrangement of the lamps 111, this diagnostic line can be dispensed with, since diagnosis is possible on the basis of the voltage U, which can be measured across the lamp segments 110,120.

In the variant shown in FIGS. 2 and 3, ten lamps 111 for the first light function, for example, can be provided in the first lamp segment 110 and six lamps 121 for the second light function in the second lamp segment 120. Also, eight lamps 111 for the first light function can be provided in the third lamp segment 131 and twelve lamps 121 for the second light function in the fourth lamp segment 132.

Consequently, a uniform lighting and brightness in accordance with the first and/or second light function can be made possible with an alternating operation of the light segments. Furthermore, the voltage drop across the lamp segments 110,120 can be distinguished in this way in order to distinguish normal operation from faulty operation.

Conventionally, a third lamp segment having twelve LEDs of a first light function, a fourth lamp segment having twelve LEDs of a second light function, and a parallel circuit of a first and a second lamp segment each having, for example, six LEDs of a different light function, can be provided. The ECU can operate these segments in alternation on a single channel through electronic switches S1 to S3. Diagnosis of faults in the case of this operation is technically complex, however, since operation of, for example, the third LED segment cannot be distinguished from operation of the fourth LED segment. In contrast, the solution according to the invention allows reliable and technically simpler diagnosis.

Provision can be made that, as per FIGS. 2 and 3, the parallel circuit of the first and second lamp segments 110, 120 is connected in series with at least the third lamp segment 131 and the fourth lamp segment 132, wherein the parallel circuit of the first and second lamp segments 110, 120 and at least the third lamp segment 131 and the fourth lamp segment 132 are driven in alternation by the monitoring device 150 via at least one switching unit S1, S2, S3 in order to provide a respective light function in a respective normal operation mode. In the example shown, the switching units S1, S2, S3 are provided as short-circuit switches, which are integrated in the monitoring device 150 in FIG. 2, and in FIG. 3 are provided outside the monitoring device 150 by way of example. The at least one switch 140 can comprise, for example, two switch 140 outside the monitoring device 150, which are each driven by an electrical signal (referred to hereinbelow as SELECT signal) from the monitoring device 150.

In the examples shown, two of the three switching units S1, S2, S3 are always closed. Thus, in FIG. 2 the switching units S1 and S2 are closed and the switching unit S3 is open. The switch 140 in the current path of the first lamp segment 110, on the other hand, is open and the switch 140 in the current path of the second lamp segment 120 is closed. Consequently, a flow of current can take place through the second lamp segment 120, and the second normal operation mode 220 can be provided. The current can be output through a channel of the monitoring device 150 for this purpose. In FIG. 3, in contrast, the switching units S2 and S3 are closed, but S1 is open. Consequently, the flow of current takes place through the third lamp segment 131.

The diagnosis of whether the particular correct lamp segment is supplied with current is accomplished for the third and fourth lamp segments 131,132 through the monitoring device 150, for example. However, the diagnosis for the first and second lamp segments 110,120 cannot conventionally take place in the monitoring device 150 for technical reasons (measuring the voltage U would produce the same value), which is why an additional circuit and diagnosis line to the monitoring device 150 can be required for this purpose in conventional solutions. According to the invention, however, different voltage drops can be provided for the first and second lamp segments 110,120, for example through an asymmetrical arrangement of the lamps 111,121. As a result, diagnosis of the lamp segments 110,120 can also be implemented in the monitoring device 150. On account of the different number of lamps that that may, if appropriate, be used, it is now possible to identify which lamp segment 110,120 is supplied with current through a voltage measurement of the voltage U.

Figure 4:
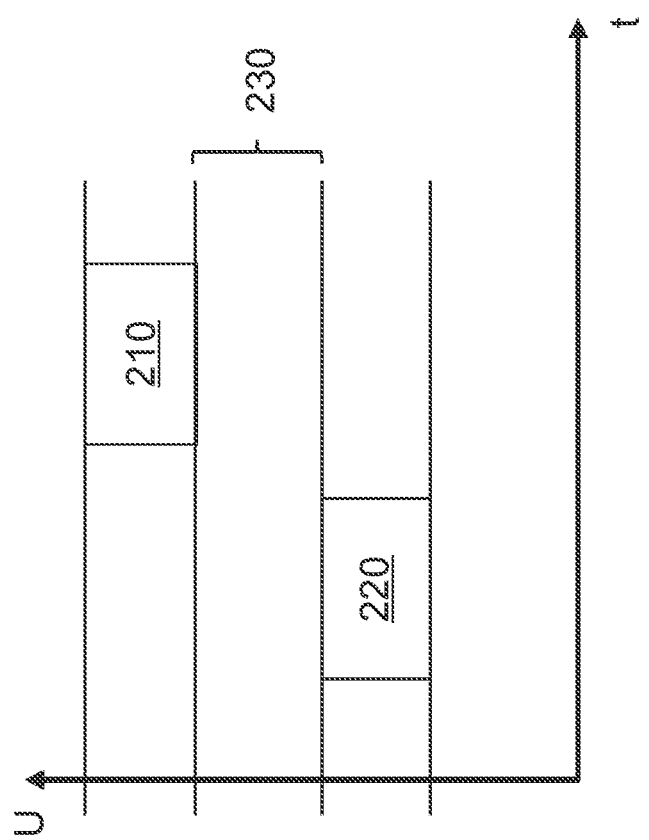
FIG. 4 shows a first and a second normal operation mode.

Approximately 3 V forward voltage, for example, are provided for each lamp, in particular LED. This must be multiplied by the number of lamps in the lamp segment to obtain the voltage drop. However, as shown in FIG. 4, tolerances of the forward voltage of the lamps can be taken into account (for example, min. 2.85 V and max. 3.25 V). The lamp segments 110,120 can therefore be designed in such a manner that a voltage drop of the first lamp segment 110 additionally differs by the tolerance window 230 from a voltage drop of the second lamp segment 120.

Shown in FIG. 4 is that the voltage drop, which is to say the sensed voltage U, in the first normal operation mode 210 can be above the voltage drop in the second normal operation mode 220. On account of the tolerances of the lamps, a single voltage value is not provided in each case, but instead a range. In order to prevent overlapping, the tolerance window 230 is provided.

Figure 5:
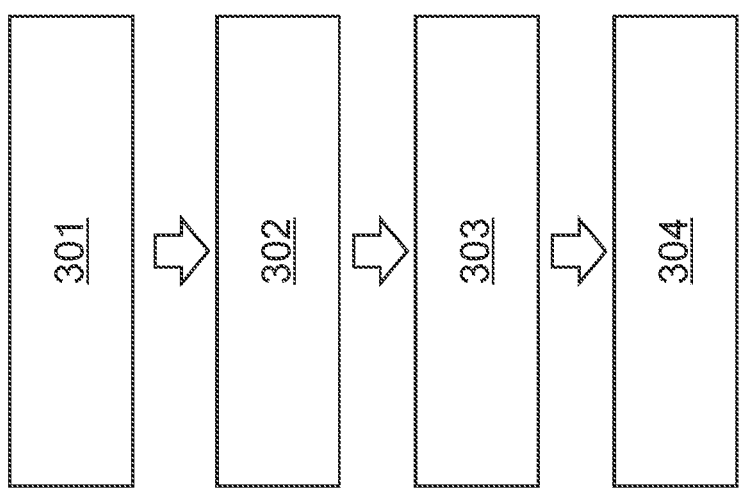
FIG. 5 shows steps of a method according to the invention.

In FIG. 5, a method for diagnosis of faulty operation with at least two different light functions for a vehicle 1 is visualized schematically. In accordance with a first step 301, a provision by a first lamp segment 110 of a first light function in a first normal operation mode 210 takes place in this case. In accordance with a second step 302, a provision by a second lamp segment 120 of the first or a second light function in a second normal operation mode 220 takes place, wherein the second light function differs from the first light function, wherein the second lamp segment 120 is connected in parallel to the first lamp segment 110. In a third step 303, a switchover between the first and second normal operation modes 210, 220 by at least one switch 140 takes place. In a fourth step 304, a sensing by a monitoring device 150 of an electrical voltage U across the lamp segments 110,120 takes place to distinguish the normal operation modes 210,220 from faulty operation, wherein the monitoring device 150 is electrically connected to the lamp segments 110,120 for this purpose. The normal operation modes 210,220 can then be diagnosed by the monitoring device 150 when the electrical voltages U sensed in the first and second normal operation modes 210,220 differ from one another. Otherwise, faulty operation can be diagnosed. Preferably, the ECU 150 continuously measures the voltages on the channel. Measurement and comparison takes place while the lamp segment 110 is switched on. Switchover to the lamp segment 120 then takes place, and direct measurement takes place again.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement to provide at least one or multiple light functions for a vehicle, the arrangement comprising:
    a first lamp segment to provide a first light function in a first normal operation mode;
    a second lamp segment to provide the first or a second light function in a second normal operation mode, the second lamp segment being connected in parallel to the first lamp segment;
    at least one switch to switchover between the first and second normal operation modes; and
    a monitoring device electrically connected to the first and second lamp segments to sense an electrical voltage across the first and second lamp segments for distinguishing the first and second normal operation modes from a faulty operation of the first and second lamp segments,
    wherein the first and second lamp segments are designed to be different, such that the electrical voltage sensed by the monitoring device in the first normal operation mode differs from the electrical voltage sensed by the monitoring device in the second normal operation mode.

2. The arrangement according to claim 1, wherein the first and second lamp segments are designed to be different in that the first lamp segment has a different number of lamps than the second lamp segment, so that the lamps of the first and second lamp segments are asymmetrically distributed.

3. The arrangement according to claim 1, wherein the first and second lamp segments are designed to be different in that the first and second lamp segments each provide a different voltage drop for the sensing by the monitoring device.

4. The arrangement according to claim 3, wherein the first and second lamp segments are designed such that a voltage drop of the first lamp segment additionally differs by a tolerance window from a voltage drop of the second lamp segment.

5. The arrangement according to claim 1, wherein the first and second lamp segments each have multiple lamps of that are light-emitting diodes.

6. The arrangement according to claim 1, wherein the second lamp segment is designed to provide the second light function in the second normal operation mode, wherein the second light function differs from the first light function, wherein the first and second light functions are designed as different light functions from among the following light functions of vehicle lighting of the vehicle: a directional indicator or a daytime running light or a high beam or a low beam or a fog light or a parking light or a position light or a brake light or license plate lighting or radiator grille lighting or emblem lighting or lighting to display animations.

7. The arrangement according to claim 1, wherein the second lamp segment is connected in parallel to the first lamp segment in that lamps of the first lamp segment are arranged in a current path that is parallel to a current path of the lamps of the second lamp segment, such that a parallel circuit of the first and second lamp segments is provided, and wherein a first switch and a second switch for alternately closing the current paths are provided as the at least one switch for switchover between the first and second normal operation modes in alternation.

8. The arrangement according to claim 7, wherein the parallel circuit of the first and second lamp segments is connected in series with at least a third lamp segment and a fourth lamp segment, wherein the parallel circuit of the first and second lamp segments and at least the third lamp segment and the fourth lamp segment are driven in alternation by the monitoring device via at least one switching unit to provide a respective light function in a respective normal operation mode.

9. A method to diagnose a faulty operation in at least one light function for a vehicle, the method comprising:
   providing, by a first lamp segment, a first light function in a first normal operation mode;
   providing, by a second lamp segment, the first or a second light function in a second normal operation mode, the second lamp segment being connected in parallel to the first lamp segment;
   switching over between the first and second normal operation modes by at least one switch;
   sensing, by a monitoring device, an electrical voltage across the first and second lamp segments to distinguish the first and second normal operation modes from the faulty operation, the monitoring device being electrically connected to the first and second lamp segments; and
   diagnosing the first and second normal operation modes by the monitoring device when the electrical voltages sensed in the first and second normal operation modes differ from one another.

10. The method according to claim 9, wherein the first and second lamp segments are designed to be different, such that the electrical voltages sensed in the first and second normal operation modes by the monitoring device differ from one another.

11. The arrangement according to claim 2, wherein all of the lamps of the first lamp segment are connected in series to one another, and wherein all of the lamps of the second lamp segment are connected in series to one another.

* * * * *